UNITED STATES PATENT OFFICE 2,412,113

PURIFYING OF ALKYLOLAMIDES

Harland H. Young, Chicago, Ill., and David Rubinstein, Brookline, Mass., assignors to Industrial Patents Corporation, Chicago, Ill., a corporation of Delaware No Drawing. Application April 14, 1943, Serial No. 483,062

4 Claims. (Cl. 260—404)

This invention relates to the purifying of alkylolamides and more particularly to the removal of basic substances from mixtures containing alkylolamides including mixtures resulting from reacting fatty or other organic acids or esters of such acids with alkylolamines in order to produce alkylolamides. Esters of fatty or other organic acids with glycerol or with other monohydroxy, dihydroxy or trihydroxy alcohols will react with alkylolamines to produce reaction mixtures in which a large number of compounds exist in equilibrium. This reaction, if carried on in the presence of an excess of the alkylolamine and under carefully controlled conditions can be made to consist predominantly of alkylolamides of the acids. Similarly, reaction mixtures can be produced by reacting the acids themselves with alkylolamines. Thus by reacting alkylolamines with fatty acids an equilibrium mixture is produced containing the fatty acids, the alkylolamine, alkylolamine soaps, alkylolamine esters, alkylolamides and alkylolamide esters. If the reaction is carried on between an alkylolamine and esters of fatty acids, the reaction mixture may also contain the ester as well as the alcohol of the ester. Other by-products of unknown structure may exist but such by-products are in general basic in reaction because of free nitrogen functions.

The present invention is directed to removing the basic impurities in such mixtures and is particularly applicable to reaction products between glycerides of higher fatty acids such as vegetable or animal oils and either mono-alkylolamines or dialkylolamines. By reacting the glyceride with an alkylolamine in the presence of an excess of the alkylolamine a reaction mixture consisting predominantly of alkylolamides of the higher fatty acids can be produced which alkylolamides exist in equilibrium with alkylolamine, glycerides, glycerol, alkylolamine soaps and alkylolamine esters as well as alkylolamide esters. If the reaction is with a dialkylolamine there are also other possible reaction products such as the dialkylolamine monoacid ester and the dialkylolamide monoacid ester. The basic reacting materials, among which are alkylolamine soaps, excess alkylolamine and alkylolamine esters cause the reaction products to develop off flavors and odors which deleteriously affect the mixtures for use in edible and other products. It has been found that substantially all of the materials causing such deleterious flavors or odors, can be removed from the mixture by neutralization with an acidic material which will produce insoluble precipitates or foots separable from the mixture in any desired manner such as settling, filtration, or centrifugal separation. By treating the reaction mixture with the acidic material in the presence of a small amount of water the neutralization reaction is facilitated and other materials such as the glycerol or other alcohol which may be present in the mixture are usually removed as part of the foots.

It is, therefore, the object of the present invention to remove basic and other impurities from mixtures containing alkylolamides so as to produce purified alkylolamides.

Another object of the invention is to provide a process by which basic impurities are removed from crude alkylolamides as an insoluble precipitate.

Another object of the invention is to provide a process of purifying alkylolamides containing basic impurities by the employment of acidic materials forming insoluble precipitates or foots.

Another object of the invention is to provide a process of purifying alkylolamides of fatty acids in which strong mineral acids or compounds of such acids with weak bases are employed to form insoluble precipitates with basic reacting impurities.

A further object of the invention is to provide a process of purifying alkylolamides of fatty acids containing basic impurities in which the alkylolamides are dissolved in an inert solvent and the impurities are neutralized to form compounds insoluble in the solvent.

A still further object of the invention is to provide a process of purifying alkylolamides containing basic impurities in which a solid acid reaction material is employed to remove such impurities.

The preferred practice of the present invention includes the addition of a strong mineral acid in a small quantity of water to the reaction products of an alkylolamine and a glycerol ester of higher fatty acids which reaction products contain basic impurities such as the alkylolamine, alkylolamine esters, alkylolamine soaps, etc. Sufficient acid is preferably added and thoroughly admixed with the reaction products to neutralize all of the basic impurities. A precipitate forms which is insoluble in the alkyolamides or any glycerol esters or alkylolamide esters which are present. This precipitate in most cases readily settles and can be removed by decanting the alkylolamides or by filtration or centrifugal separation. This precipitate is generally flocculent and resembles the foots obtained in the refining of ordinary vegetable and animal fats or oils. If the alkylolamide is to be incorporated in glyceride oils, which is many times the case, the crude alkylolamide may be added to the glyceride oil prior to refining in accordance with the present invention. Thus the glyceride oil or fat functions as a solvent for the alkylolamide during the refining operation and assists in separating the precipitate from the alkylolamides as this precipitate is also insoluble in the glyceride oil. Any alkylolamide esters present are also retained in the glyceride oil and are not objectionable. The temperature of refining will vary with different alkylolamides depending upon the alkylolamine employed or the fatty acids present in the alkylolamide and upon the nature of the glyceride oil solvent, if one is employed. In general the temperature should be sufficiently high to render fluid the crude reaction mixture or the glyceride oil in which it is incorporated. Thus, when refining alkylolamides or alkylolamides admixed with glyceride oils containing substantially saturated fatty acid radicals, such materials should be heated to a temperature sufficiently above the melting point to render them fluid prior to the refining operation. Thus the temperatures employed may range between approximately 70° F. and 180° F. although in some cases higher temperatures may be desirable.

The preferred reagent is phosphoric acid in a concentration between approximately 50% and 90%, as such phosphoric acid also makes it possible to selectively remove the impurities. Thus, the alkylolamine phosphate is somewhat more insoluble than the alkylolamine ester phosphate and can be selectively precipitated to remove it from either the alkylolamide alone or from the alkylolamide dissolved in a glyceride oil or other ester of a higher fatty acid. By adding just slightly more phosphoric acid solution than that necessary to react with the alkylolamine, this material can be substantially completely removed from the mixture after which additional phosphoric acid solution can be added to precipitate the alkylolamine ester phosphate. Other strong mineral acids such as sulfuric and hydrochloric acids in substantially the same concentration referred to above can, however, be employed to remove the basic impurities from the alkylolamides.

Other acid reacting materials may also be employed to remove basic impurities. For example, various salts of strong acids such as sulfuric, hydrochloric, and phosphoric with weak bases in the form of granular salts can be employed as filters through which the crude alkylolamide mixture is passed. The admixture of a small amount of moisture or water with the crude alkylolamide mixture facilitates the removal of the basic impurities. It is also possible to suspend such acid reacting salts by agitation in the crude mixture or crude mixture combined with a solvent, and allow the same to settle. Such operation causes the basic ingredients of the crude mixture to react with the salts and insoluble products formed thereby to be removed from the mixture. The dampening of the granular salt with a small amount of water prior to admixing the same with the mixture to be refined or the addition of a small amount of water to the mixture during refining with the granular material assists in the reaction with the basic materials. It is apparent that concentrated solutions or slurries of such acid reacting salts may also be employed as a refining agent. Many other acid reacting materials such as lower fatty acids neutralize the alkaline impurities in the reaction mixtures above referred to but yield compounds which retain their solubility in the mixture, which compounds cannot be easily removed from the mixture. The invention, therefore, is concerned with the employment of acids or acidic materials which form insoluble precipitates with the basic impurities, mineral acids or their salts with weak bases being the preferred acidic material, but any acid reacting material either organic or inorganic which is sufficiently acid to neutralize the basic materials and which produces insoluble foots which may be removed from the reaction mixture may be employed in the present invention. Materials other than strong acids which are contemplated for use in the invention include sodium dihydrogen phosphate, sodium acid sulphate, potassium acid tartrate and aluminum sulphate. Other salts of like nature and edible could also be used.

While the invention has been specifically described with respect to reaction mixtures produced by reacting an alkylolamine with a glycerol ester of higher fatty acids, it is also applicable to refining of reaction mixtures of alkylolamines with the fatty acids themselves, with esters other than the glycerol esters of fatty acids, acid anhydrides, acid chlorides, or other acylating agents all of which acylating agents are included in the term lypophyllic acylating agents. In general it is desired to remove all of the materials in the reaction mixture which have a free nitrogen function which includes any alkylolamine present or the alkylolamine esters. Any alkylolamine soaps are also decomposed to liberate the amine so that the amine portion of such compounds may likewise be removed from the mixture. Also, glyceride oils or fats have been described as a solvent for the reaction material during the refining operation. It will be apparent that any inert solvent for the alkylolamides being treated may be employed. The foots produced by the refining operation may be removed from such admixtures by filtration, decantation or centrifugal separation and other impurities such as coloring matter, etc., are to a large extent removed with the foots by adsorption thereon.

While we have described the preferred embodiments of our invention, it is understood that the details thereof may be varied within the scope of the following claims.

We claim:

1. The method of purifying alkylolamides associated with other reaction products formed in reacting alkylolamines with fatty acids and their esters and containing alkylolamides, and other basic substances of bitter flavor, which comprises treating the crude alkylolamides with an aqueous solution of a mineral acid material in a glyceride solvent for said alkylolamides and alkylolamine esters to neutralize said basic substances and to precipitate the same as insoluble compounds, while maintaining the temperature sufficiently high during the treatment to render the solution of alkylolamides in a liquid condition and thereafter separating said compounds from the purified alkylolamides.

2. The method of purifying crude alkylolamides of higher fatty acids formed by reacting an excess of alkylolamines with higher fatty acids and glycerides thereof, said crude alkylolamides containing alkylolamides, and other side reaction products of a basic nature and having a bitter flavor, which comprises contacting a solution of said crude alkylolamides in a glyceride oil with an aqueous solution of a neutralizing agent containing a mineral acid to convert said basic substances into insoluble salts, supplying sufficient heat during the operation to keep the solution of alkylolamides in a liquid condition and then separating said insoluble salts from the solution of purified alkylolamides.

3. The method according to claim 2 in which the neutralizing agent is aqueous phosphoric acid of about 50% to 90% concentration.

4. The method according to claim 2 in which the glyceride oil is triglyceride fat.

HARLAND H. YOUNG.
DAVID RUBINSTEIN.